United States Patent [19]

MacAfee et al.

[11] 4,114,856
[45] Sep. 19, 1978

[54] VALVE SEAT INSERT

[75] Inventors: Jerry D. MacAfee, Northboro; Ronald J. Collette, Spencer, both of Mass.

[73] Assignee: Jamesbury Corp., Worcester, Mass.

[21] Appl. No.: 775,311

[22] Filed: Mar. 7, 1977

[51] Int. Cl.² ............................................. F16K 1/22
[52] U.S. Cl. .................................... 251/306; 251/307; 251/173
[58] Field of Search ......................... 251/306, 307, 173

[56] References Cited

U.S. PATENT DOCUMENTS

| 3,144,040 | 8/1964 | White | 251/307 X |
| 3,552,407 | 1/1971 | Hirano | 251/307 X |
| 3,608,861 | 9/1971 | Helman | 251/173 |
| 3,650,508 | 3/1972 | Kosmala | 251/307 X |
| 3,658,292 | 4/1972 | Takigawa | 251/173 X |
| 3,774,880 | 11/1973 | Crookham | 251/307 |
| 3,986,699 | 10/1976 | Wucik | 251/173 |
| 4,005,848 | 2/1975 | Eggleston | 251/307 X |

Primary Examiner—Harold W. Weakley
Attorney, Agent, or Firm—Oblon, Fisher, Spivak, McClelland & Maier

[57] ABSTRACT

A valve seat insert is disclosed which is useful in a butterfly valve of the type disclosed and claimed in U.S. Pat. No. 3,608,861. In such valves, disc and sealing ring contact pressure is enhanced by fluid pressure in the fluid line regardless of the direction of fluid pressure. The valve seat mechanism provides a fulcrum to control deflection of the seat ring when the seat is pressurized from the stem side, and also, by means of an insert with a locking ridge, limits undesirable inward radial movement of the seat ring.

3 Claims, 4 Drawing Figures

VALVE SEAT INSERT

BACKGROUND OF THE INVENTION

1. Field of the Invention

This invention relates generally to butterfly valves, and more particularly to a mechanism for limiting undesirable inward radial movement of the seat ring in a butterfly valve of the type disclosed in commonly owned U.S. Pat. No. 3,608,861.

2. Description of the Prior Art

This invention relates to rotary fluid control valves of the butterfly type wherein a disc is mounted for rotation between the open position, in which the disc lies substantially parallel to the axis of the fluid flow channel through the valve, and the closed position in which the disc lies perpendicularly to this axis. The disc is mounted for rotation on a valve stem which is attached to the disc on one side. For convenience, said side is hereinafter referred to as the stem side of the disc. The disc cooperates with an annular flexible seat circumscribing the fluid flow channel to shut off fluid flow through the channel. More particularly, the invention relates to such valves in which the action of the internal fluid pressure acting upon the valve serves to enhance the contact pressure between the flexible seat and the disc, regardless of the direction in which fluid pressure is applied.

An example of such a butterfly valve is disclosed and claimed in commonly owned U.S. Pat. No. 3,608,861. In such a valve, the application of internal fluid pressure on the closed valve displaces both the disc and a portion of the seat ring. The disc displacement is uniform in either direction, i.e. whether the fluid pressure of a given value is applied from the right or left, the respective displacement of the disc to the right or left will be the same. The displacement of the portion of the seat ring that is exposed to the fluid in not uniform, however, since the flexibility of the valve seat is controlled by the location of fulcrums about which the seat bends. The fulcrums are at different radial distances measured from the central fluid flow axis in the valve. This displacement of fulcrums, taken together with the cross-sectional shape of the portion of the seat that contacts the disc, which is a segment of an inclined surface, enables the line pressure to enhance the sealing effectiveness between disc and seat regardless of the direction of the forces generated by such line pressure. Attention is directed to the specification of the above mentioned commonly owned patent for a more complete description of this prior art.

SUMMARY OF THE INVENTION

The present invention serves to make a butterfly valve of the type described compatible with a wide range of gasket designs and loads, and limits inward radial movement of the seat. This undesirable movement would increase the contact force between the resilient seat and the disc edge, thereby increasing the operating torque of the valve to an undesirable level.

Butterfly valves, in general, are short along the length of the pipe for cost efficiency, and thus the thickness of each part of the valve must be minimized. The valve seat is held in place in the body of the valve by means of an insert that is generally ring shaped and which fits into a complementary groove formed in the housing. The seat is placed in the groove, the insert is placed over the seat, and then the valve is installed between pipe flanges which are tightened with enough force to push the insert into the seat and thus clamp the seat between insert and valve housing. Gaskets of varying types are used between the valve and the flanges to prevent leakage.

Because the insert is generally thin, it may deflect substantially under gasket and seat loads. With hard gaskets, such as one made from asbestos, the insert simply may remain flat. With soft gaskets, such as thick rubber gasket, the radially inward edge of the insert may be substantially deflected away from the seat. Thus an insert of the type illustrated in the previously described patent responds differently to various types of gaskets. With a soft gasket, the deflected insert will compress a lesser portion of the seat and result in little or no inward movement of the seat. Thus the interference between seat and disc originally designed into the valve remains relatively constant and so too the torque required to actuate the valve. With a hard gasket, however, little deflection of the insert occurs and therefore there is interference along the entire surface of contact between the seat and the insert. This results in a greater radially inward flow of seat material which further loads the seat lip against the disc and increases the operating torque of the valve.

The type of gasket used thus introduces a large variable but to insure sealing with a soft gasket the valve design inherently resulted in greater operating torque with a hard gasket.

In the present invention, the insert is designed to limit the interference surface between seat and insert to the outer periphery of the seat ring, and to provide an open space into which the plastic seat material displaced by such interference may flow. Further, the insert has a locking ridge that presses into the seat at a site more radially inward from the just described open space and interference areas, and prevents the seat material from flowing further toward the disc edge. This in turn assures that the operating torque of the valve is not increased to undesirable levels.

Prior reference was made to fulcrums about which the seat ring tends to bend as being positioned at different radial distances from the flow axis of the valve. Since this feature is one of the aspects of the omnidirectional characteristics of the valve, this displacement of fulcrums is retained in the valve of the present invention. The locking ridge on the insert serves as one of these fulcrums and is positioned closer to the flow axis of the valve than the fulcrum on the stem side of the disc.

DESCRIPTION OF A PREFERRED EMBODIMENT

Figure 1:
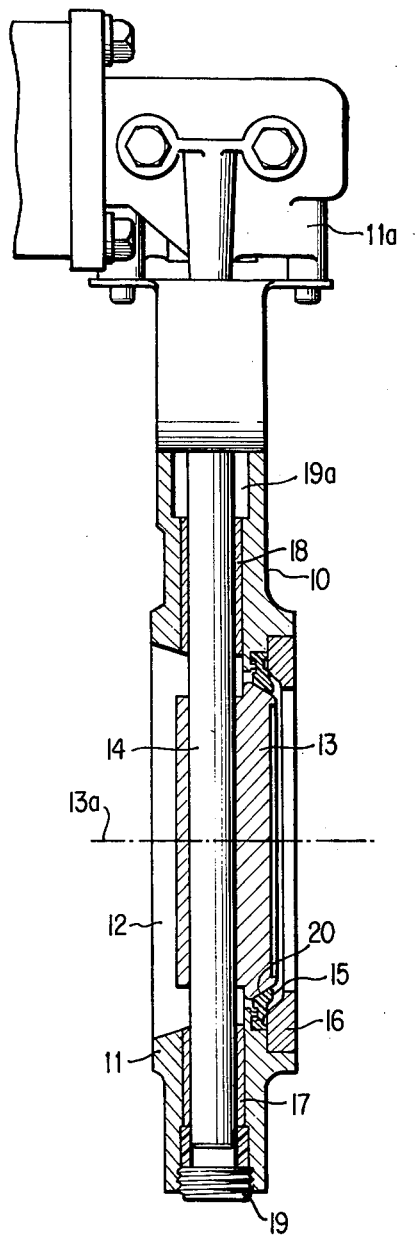
FIG. 1 is an elevation, partially in cross section of a butterfly valve employing the insert described in this application.

Depicted in FIG. 1 is a valve 10 shown optionally equipped with valve operator 11a, the details of which are not relevant to this invention. Valve 10 is comprised of valve housing 11 defining flow channel 12 of circular cross section therethrough, butterfly disc 13 mounted for rotation with shaft 14, annular flexible seat 15, and insert or seat retainer ring 16.

The fluid flow channel 12 has an imaginary flow axis indicated at 13a. Shaft 14 is essentially perpendicular to flow axis 13a. The shaft 14 is mounted for rotation in valve housing 11 with the aid of lower bearing means 17 and upper bearing means 18, neither of which is shown in detail. Plug 19 is inserted in the bottom of the shaft bore to prevent the escape of any fluid that might leak past bearing means 17. Stuffing box means 19a, also not shown in detail, permit the emergence of shaft 14 from the upper end of valve housing 11 without the loss of internal fluid.

Butterfly disc 13 is surrounded on its edge by circumferential sealing surface 20. This sealing surface is inclined with respect to flow axis 13a.

Figure 2:
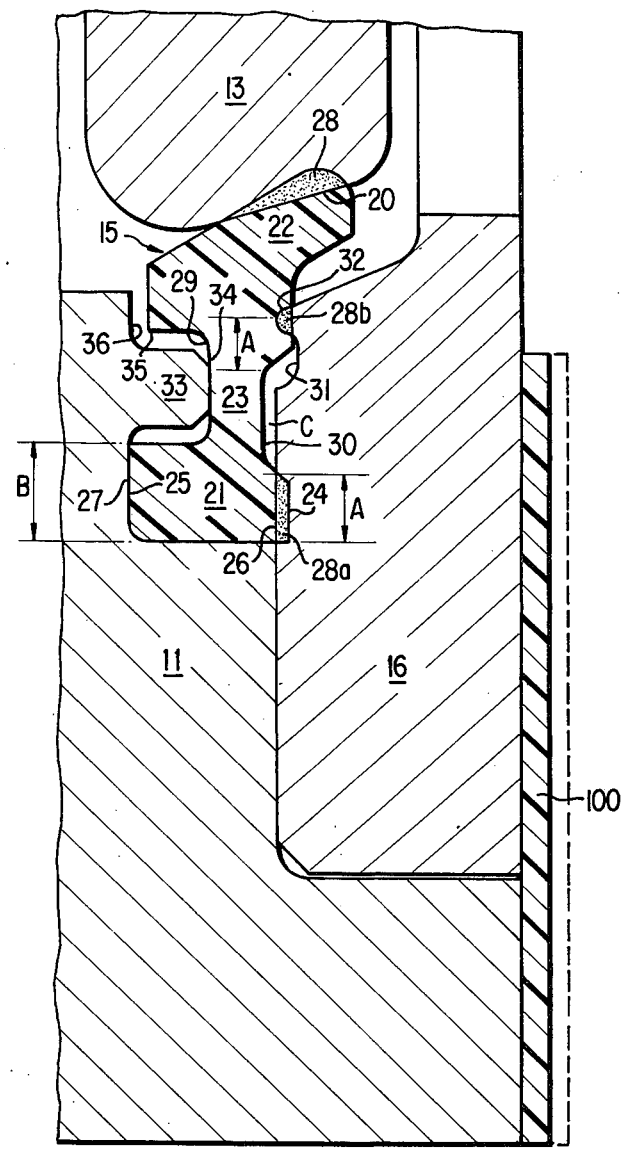
FIG. 2 is an enlarged cross-sectional representation of the zone of cooperation between the annular seat and the sealing surface on the disc of the improved valve of the instant invention shown in FIG. 1.

FIG. 2 shows, in enlargement, that portion of the valve in which the cooperation between sealing surface 20 of disc 13 and flexible annular seat 15 must occur.

The flexible annular seat 15 has an outer portion 21, and an inner portion 22 which are joined by linking portion 23. Inner portion 22 of annular flexible seat 15 is shown in FIG. 2 in its totally undeflected position, i.e. in the position which it would occupy if disc 13 were rotated out of contact into the open position. It will be understood from the overlap 28, shown in FIG. 2 in dark shading to exist between annular seat 15 and disc 13, that a force fit, or interference fit, exists between these elements. That is, when disc 13 is rotated into the closed position, a deflection of seat 15 occurs, assuring positive sealing of the valve even in the absence of internal fluid pressure.

Deflection of inner portion 22 of valve seat 15 occurs by flexure at linking portion 23 of the seat. To accommodate this flexure, linking portion 23 is deeply relieved at 29.

Valve seat 15 is held in place by engagement of valve seat surfaces 24 and 25 by adjacent surfaces 26 and 27 respectively. As is apparent from FIG. 1, rigid surface 27 is a surface of valve housing 11, and as is apparent from FIG. 2, surface 26 is a surface on insert 16. Overlap 28a, shown in FIG. 2 in dark shading, is another interference fit that assures a sealing action between insert 16 and seat 15, and together with the redundant seal between surfaces 25 and 27, these seals assure that no fluid will leak from the insert side to the valve housing side, and vice-versa, past portion 21 of seat 15.

Linking portion 23 of seat 15 is also relieved at 30 such that a clearance C exists between relief 30 and surface 31 of insert 16.

Figure 3:
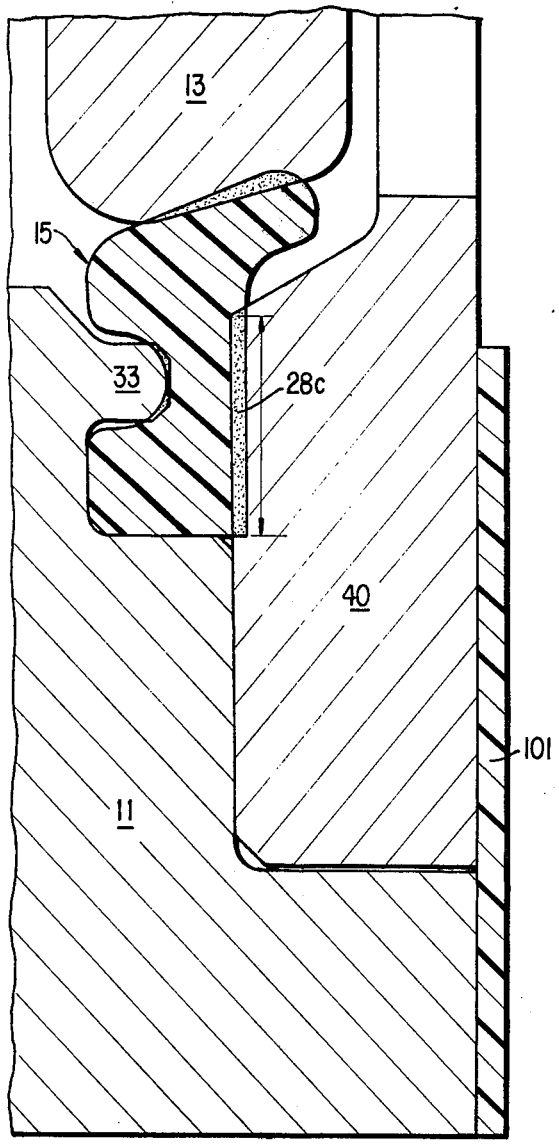
FIG. 3 is an enlarged cross-sectional representation of the zone of cooperation between the seat and the disc, and showing the cooperation between a prior art insert and seat when a hard gasket is employed.
Figure 4:
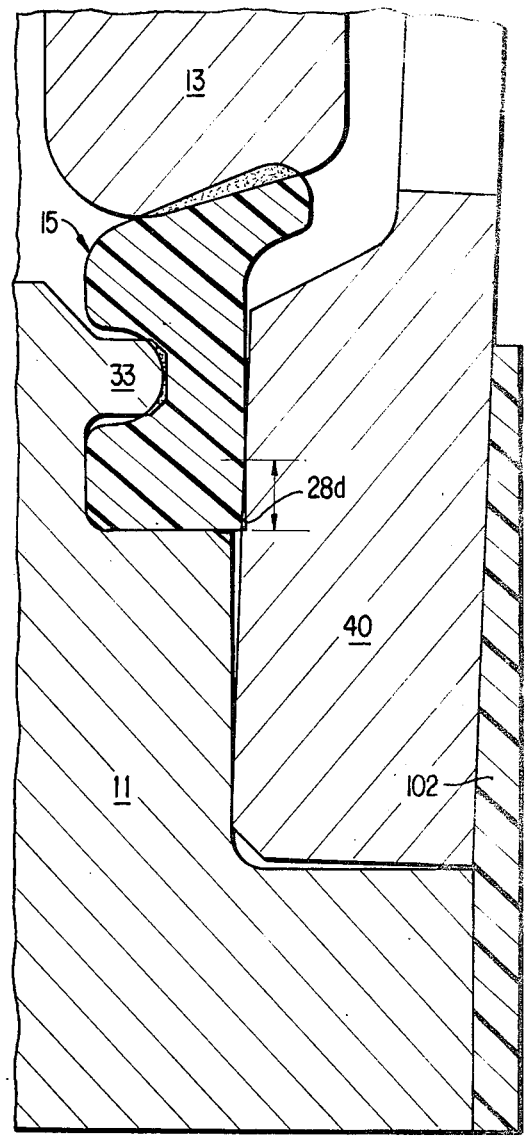
FIG. 4 is an enlarged cross-sectional representation of the zone of cooperation between the seat and the disc, and showing the cooperation between a prior art insert and seat when a soft gasket is employed.

The effect of various types of gaskets will now be described with reference to FIGS. 2-4. In FIG. 3, hard gasket 101 is positioned next to a prior art-type insert 40. When the valve is tightened between the flanges in the pipeline, insert 40 presses into seat 15 in an interference zone designated 28c. Since the plastic seat material is substantially incompressible, the seat material flows inwardly toward disc 13, thereby undesirably increasing the operating torque. In FIG. 4, soft gasket 102 is positioned next to a prior art-type insert 40. When the valve is tightened between the flanges in the pipeline, insert 40 tends to deflect somewhat from the seat and the zone of interference 28d is much smaller than the corresponding zone 28c with a hard gasket. This lesser interference means that less seat material will flow inwardly toward disc 13, and therefore the designed operating torque is affected to a much lesser degree than with a hard gasket.

In FIG. 2, gasket 100 is positioned next to insert 16. When the valve is tightened between the flanges in the pipeline, interference fit 28a between the outer periphery of the seat and the insert, and interference fit 28b between the locking ridge and the seat are created. Particularly in the case where gasket 100 is a hard gasket, seat material displaced at 28a will flow into clearance or space C, yet locking ridge 32 prevents further inward flow of the seat toward disc 13, with its attendant adverse torque effects. More specifically, locking ridge 32 "bites" into seat 15 in the region of linking portion 23, radially inward of relief 30, which in turn prevents movement of the seat.

In this manner, insert 16 assures that the pre-designed operating torque of the valve is unaffected by the type of flange gasket used with the valve.

A valve having omnidirectional characteristics of the type previously described can accomplish same by providing fulcrums on both sides of linking portion 23 of seat 15. When measured in the radial direction, the further the fulcrum is positioned from flow axis 13a, the greater the amount of bending of the seat effected by fluid pressure. With particular reference to FIG. 2, and recognizing that the disc 13 deflects essentially the same amount regardless of the side from which it is pressurized, it is desirable to have the seat deflect or bend more than the disc when pressurized from the right side but deflect or bend less than the disc when pressurized from the left side. Due to the inclined geometry of the mating surfaces of the disc and seat, pressurization from the left would, in the absence of restraint, tend to push the seat away from the disc edge. It can thus be seen that the fulcrum on the right side of the seat must be positioned inwardly enough to assure a relatively short moment arm and thus a greater resistance to deflection. Thus the seat will deflect less than the disc and the line pressure enhances the sealing effectiveness between disc and seat.

Locking ridge 32 serves as the fulcrum on the right side of the seat, and is positioned radially closer to flow axis 13a than fulcrum 33 on the left side of the seat. This radial separation of the fulcrums is indicated as A in FIG. 2. When the valve is pressurized from the right side, the seat tends to deflect about fulcrum 33, with radially inner most contact at point 34. Again, the line pressure enhances the sealing effectiveness between disc and seat. It is noted that when the seat deflects toward the left, locking ridge 32 may disengage from linking portion 23 of seat 15.

Modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A butterfly valve comprising:
    a valve housing with a fluid flow channel passing therethrough;

a disc mounted in said valve housing for rotation about an axis substantially perpendicular to the flow axis of said fluid flow channel, and having a sealing surface on its edge;

annular seat means in said valve housing disposed to cooperate with said sealing surface to interrupt flow through said valve when said closure member is rotated into the closed position;

an insert disposed adjacent to said annular seat means;

said insert having locking ridge means positioned on the radially inward edge of said insert, a zone of interference with said seat positioned radially outward of said locking ridge means, and means providing a clearance between said insert and said seat positioned between said locking ridge means and said zone of interference;

said seat and said insert having an interference fit when said valve is assembled which is limited to the outer periphery of said seat ring at said zone of interference, and to the site of said locking ridge means but with said clearance accommodating seat material displaced by said interference fit, whereby undesirable radially inward movement of said seat of a magnitude that would undesirably increase the operating torque of the valve is prevented.

2. The valve of claim 1 wherein said locking ridge means also acts as a fulcrum about which the radially inward portion of said seat may bend when the valve is pressurized, and wherein a second fulcrum is positioned on the other side of said seat at a location radially outward from said locking ridge fulcrum.

3. In a butterfly valve having a valve housing with a fluid flow channel passing therethrough, a disc mounted in said valve housing for rotation about an axis substantially perpendicular to the flow axis of said fluid flow channel and having a sealing surface on its edge, and annular seat means in said valve housing disposed to cooperate with said sealing surface to interrupt flow through said valve when said closure member is rotated into the closed position, the improvement comprising valve seat insert means adjacent said seat means which will accommodate varying types of pipe gaskets yet will prevent said seat means from undesirable radial inward movement of said seat of a magnitude that would undesirably increase the operating torque of the valve, there being an interference zone of contact between said seat and said insert at the outer periphery of said seat and at a locking ridge means on said insert at a more inward portion of said seat, and clearance means between said seat and said insert, said clearance means radially located between said zone of contact and said locking ridge means whereby said locking ridge means limits said undesirable radial inward movement and said clearance means accommodates seat material displaced at said interference zone.

* * * * *